United States Patent
Farrar et al.

(10) Patent No.: US 11,187,096 B2
(45) Date of Patent: Nov. 30, 2021

(54) PLATFORM SEAL

(71) Applicant: UNITED TECHNOLOGIES CORPORATION, Farmington, CT (US)

(72) Inventors: Bryan H. Farrar, West Hartford, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 95 days.

(21) Appl. No.: 16/677,262

(22) Filed: Nov. 7, 2019

(65) Prior Publication Data
US 2021/0140335 A1    May 13, 2021

(51) Int. Cl.
*F01D 9/04* (2006.01)
*F01D 11/00* (2006.01)
*F01D 25/12* (2006.01)

(52) U.S. Cl.
CPC ............ *F01D 11/006* (2013.01); *F01D 9/041* (2013.01); *F01D 25/12* (2013.01); *F05D 2240/125* (2013.01); *F05D 2240/81* (2013.01)

(58) Field of Classification Search
CPC ........ F01D 9/041; F01D 11/006; F01D 25/12; F05D 2240/81; F05D 2240/125
See application file for complete search history.

(56) References Cited

U.S. PATENT DOCUMENTS

| | | | |
|---|---|---|---|
| 3,966,356 A | 6/1976 | Irwin | |
| 5,154,577 A * | 10/1992 | Kellock | F01D 11/005 277/641 |
| 5,868,398 A * | 2/1999 | Maier | F01D 11/005 277/643 |
| 6,179,560 B1 * | 1/2001 | Kouris | F01D 25/246 415/190 |
| 6,503,051 B2 | 1/2003 | Predmore | |
| 6,893,214 B2 | 5/2005 | Alford et al. | |

(Continued)

FOREIGN PATENT DOCUMENTS

| EP | 3088679 | 11/2016 |
|---|---|---|
| EP | 3141703 | 3/2017 |

OTHER PUBLICATIONS

European Search Report for European Patent Application No. 20205712.1 dated Apr. 13, 2021.

*Primary Examiner* — Igor Kershteyn
(74) *Attorney, Agent, or Firm* — Carlson, Gaskey & Olds, P.C.

(57) ABSTRACT

A gas turbine engine includes a plurality of airfoil vanes situated in a circumferential row about an engine central axis. Each of the plurality of airfoil vanes include a first platform, and a second platform, and an airfoil section therebetween. A face of the first platform includes a trailing edge recess and a leading edge recess. The trailing edge recess and leading edge recesses of adjacent ones of the first platforms together define a slot. A sealing element situated in each slot. The sealing element has a geometry that tracks the geometry of the slot such that the seal is trapped in the slot by a form-fit relationship in circumferential and axial dimensions by a form-fit relationship between the sealing element and the slot. A method of sealing a plurality of airfoil vanes is also disclosed.

20 Claims, 3 Drawing Sheets

(56) References Cited

U.S. PATENT DOCUMENTS

| | | | |
|---|---|---|---|
| 7,261,514 B2 * | 8/2007 | London | F01D 5/225 |
| | | | 415/134 |
| 8,182,208 B2 * | 5/2012 | Bridges, Jr. | F01D 11/005 |
| | | | 415/139 |
| 8,308,428 B2 * | 11/2012 | Bridges, Jr. | F01D 9/041 |
| | | | 415/139 |
| 8,684,673 B2 * | 4/2014 | Salazar | F01D 11/005 |
| | | | 415/139 |
| 9,714,580 B2 | 7/2017 | Slavens et al. | |
| 9,988,923 B2 * | 6/2018 | Snyder | F01D 11/005 |
| 2002/0187040 A1 | 12/2002 | Predmore | |
| 2015/0377035 A1 | 12/2015 | Freeman et al. | |
| 2016/0290145 A1 | 10/2016 | Roussille et al. | |
| 2019/0010815 A1 | 1/2019 | Watanabe | |
| 2019/0153886 A1 | 5/2019 | Vetters et al. | |

\* cited by examiner

PLATFORM SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Any of the fan section, the turbine section, and the compressor section include airfoils, such as for fan, compressor, or turbine blades/vanes. Cooling air is provided to the airfoils. Seals are provided to discourage leakage of this cooling air between adjacent airfoils.

SUMMARY

A gas turbine engine according to an example of this disclosure includes a plurality of airfoil vanes situated in a circumferential row about an engine central axis. Each of the plurality of airfoil vanes include a first platform, and a second platform, and an airfoil section therebetween. A face of the first platform includes a trailing edge recess and a leading edge recess. The trailing edge recess and leading edge recesses of adjacent ones of the first platforms together define a slot. A sealing element situated in each slot. The sealing element has a geometry that tracks the geometry of the slot such that the seal is trapped in the slot by a form-fit relationship in circumferential and axial dimensions by a form-fit relationship between the sealing element and the slot.

In a further example of the foregoing, a support ring is configured to support each first platform. The support ring includes a plurality of pedestals which correspond to each slot and are configured to retain the sealing elements in the slots in a radial direction.

In a further example of any of the foregoing, the first platform is a radially outer platform and the support ring is connected to an engine casing structure.

In a further example of any of the foregoing, the sealing elements include one or more legs configured to engage the plurality of lugs.

In a further example of any of the foregoing, each slot includes first and second portions. The first portion is formed in a leading edge of each outer platform and the second portion is formed in a trailing edge of each outer platform.

In a further example of any of the foregoing, the first portion is defined by a radial face and a circumferential face. The circumferential face forms an obtuse angle with the axial face.

In a further example of any of the foregoing, the sealing element includes a main body portion and a biased portion which extends from the main body portion at an angle that corresponds to the obtuse angle.

In a further example of any of the foregoing, a support ring is configured to support each platform. The support ring includes a plurality of pedestals. Each pedestal includes a biased portion that corresponds to the circumferential face. The biased portion of the each pedestal is configured to bias the biased portion of each sealing element against the circumferential face.

In a further example of any of the foregoing, each pedestal includes a cooling hole which is configured to transmit cooling air through the support ring into each slot against each sealing element.

In a further example of any of the foregoing, the second portion is defined by an axial face and a circumferential face. The circumferential face is generally perpendicular to the axial face.

In a further example of any of the foregoing, each sealing element is formed of a ductile metallic material.

A method of sealing a plurality of airfoil vanes according to an example of this disclosure includes situating a sealing element in a slot formed in a face of platforms of adjacent airfoil vanes. The sealing element has a geometry that tracks the geometry of the slot such that the sealing element is trapped in the slot in circumferential and axial dimension by a form-fit relationship between the sealing element and the slot.

In a further example of the foregoing, the platforms are supported in a support ring. The support ring includes a pedestal that is configured to be received in the slot and retain the sealing element in the slot in a radial dimension.

In a further example of any of the foregoing, cooling air is provided to the slot and against the sealing element via a cooling hole in the pedestal.

In a further example of any of the foregoing, the slot includes first and second portions. The first portion formed in a leading edge of an platform of the adjacent outer platforms and the second portion formed in a trailing edge of the other platform of the adjacent outer platforms.

In a further example of any of the foregoing, the first portion is defined by a radial face and a circumferential face. The circumferential face forms an obtuse angle with the axial face.

In a further example of any of the foregoing, the sealing element includes a main body portion and a biased portion which extends from the main body portion at an angle that corresponds to the obtuse angle.

In a further example of any of the foregoing, the platforms are supported in the support ring. The support ring includes a pedestal that is configured to retain the sealing element in the slot.

In a further example of any of the foregoing, the pedestal includes a biased portion that corresponds to the circumferential face. The biased portion is configured to trap the biased portion of the sealing element against the circumferential face.

In a further example of any of the foregoing, each sealing element is formed of a ductile metallic material.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
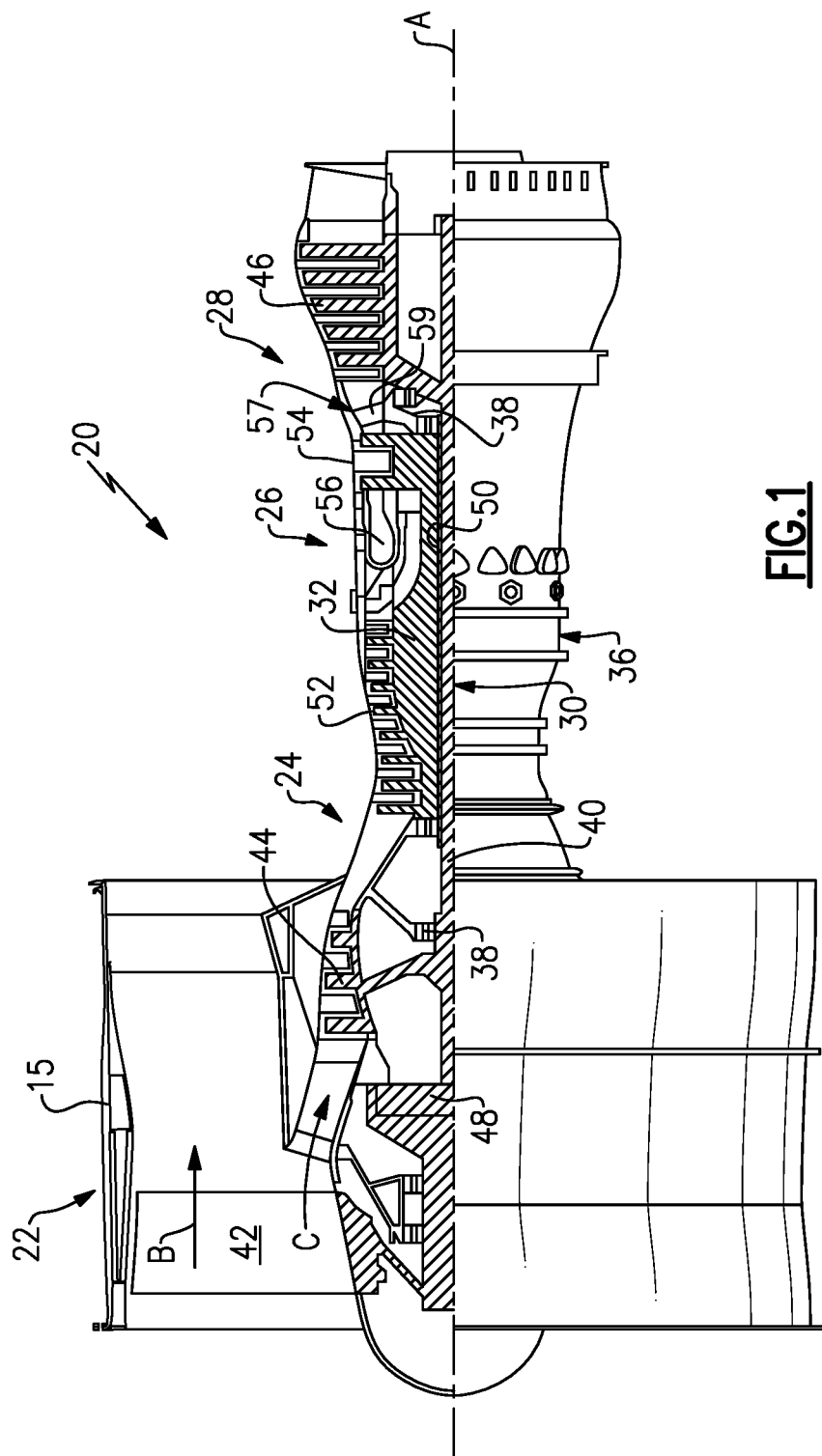
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^ 0.5. The "Low corrected fan tip speed" as disclosed herein according to one non-limiting embodiment is less than about 1150 ft/second (350.5 meters/second).

Figure 2:
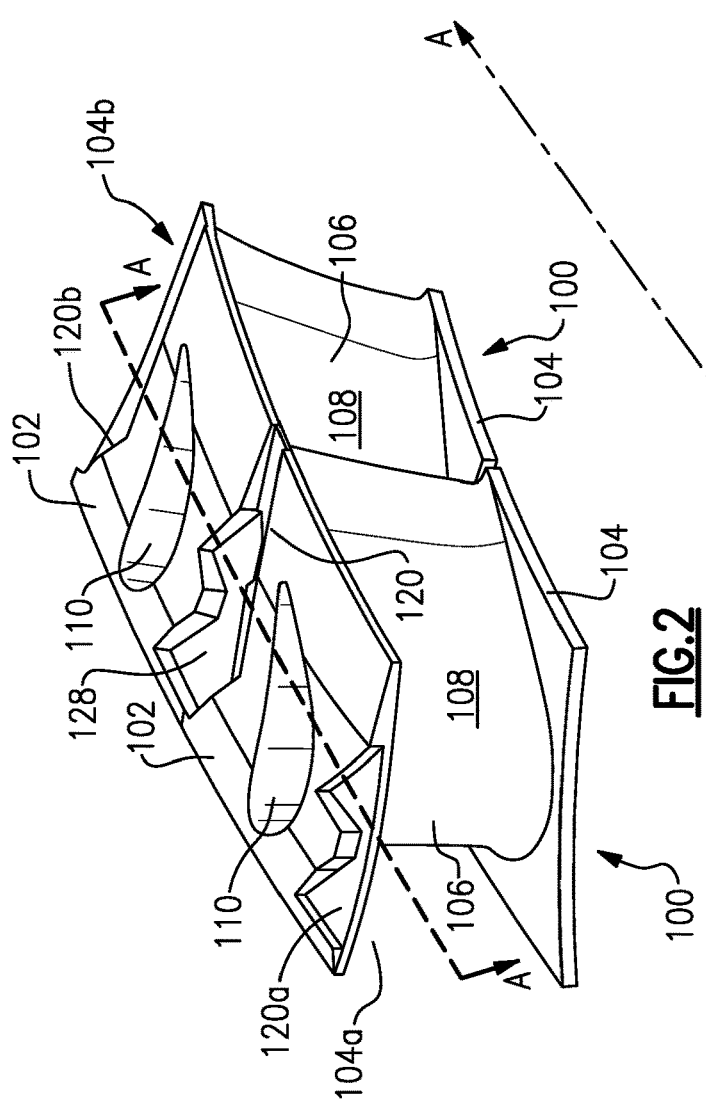
FIG. 2 schematically shows an airfoil vane for the gas turbine engine of FIG. 1.

FIG. 2 schematically shows an airfoil vane 100 from the turbine section 28 of the engine 20. Although the airfoil vane 100 is shown and described with reference to application in the turbine section 28, it is to be understood that the examples herein are also applicable to structural vanes in other sections of the engine 20. Additionally, the example vane airfoil vane 100 is a "singlet" that has a single airfoil between the inner and outer platforms. However, it is to be understood that the examples can also be applied to vane "doublets" that have two airfoils between inner and outer platforms, or vane "triplets" that have three airfoils between the inner and outer platforms. Thus, "a" and "an" used with regard to airfoils or airfoil sections of the vane airfoil vane 100 do not preclude more than one. A plurality of airfoil vanes 100 are situated in a circumferential row about the engine central axis A. The airfoil vane 100 includes a first or inner platform 102, a second or outer platform 104, and an airfoil section 106 that spans between the inner and outer platforms 102/104. The airfoil section 106 includes an airfoil outer wall 108 that delimits the profile of the airfoil section 106. The outer wall 108 circumscribes an internal cavity 110.

In one example, the airfoil vane 100 is formed of a ceramic material, such as a ceramic matrix composite (CMC) material. For example, the CMC includes a ceramic matrix and ceramic fibers disposed in the ceramic matrix.

The ceramic matrix may be, but is not limited to, silicon carbide (SiC) and the ceramic fibers may be, but are not limited to, silicon carbide (SiC) fibers. The CMC is comprised of fiber plies that are arranged in a stacked configuration and formed to the desired geometry of the airfoil vane 100. For instance, the fiber plies may be layers or tapes that are laid-up one on top of the other to form the stacked configuration. The fiber plies may be woven or unidirectional, for example. At least a portion of the fiber plies are continuous through the platforms 102/104 and the airfoil section 106. In this regard, the airfoil vane 100 is a continuous body in that the fiber plies are uninterrupted through the platforms 102/104 and the airfoil section 106. The airfoil vane 100 may also be a monolithic ceramic material, such as a silicon-containing ceramic. Examples of such ceramics include silicon nitride and silicon carbide.

Figure 3:
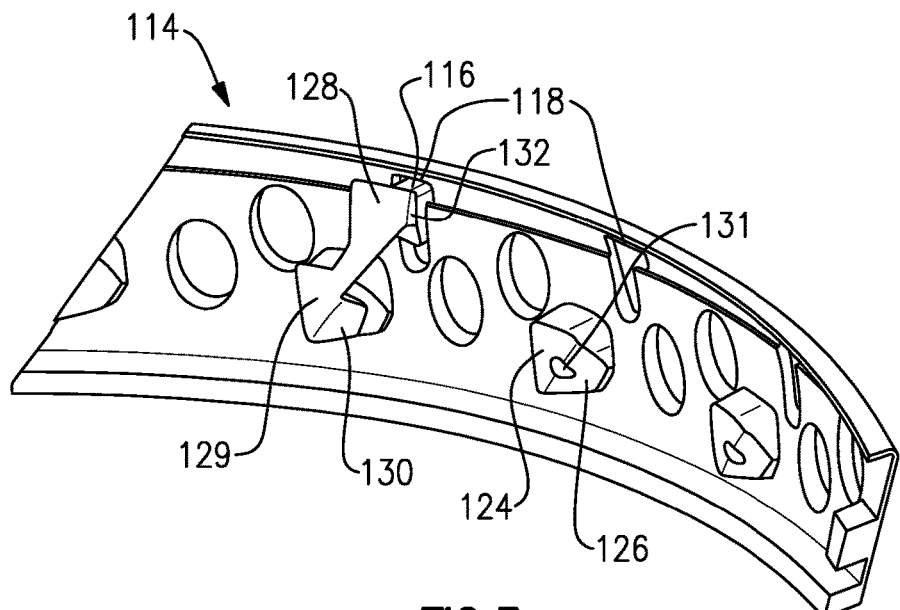
FIG. 3 schematically shows a portion of a support ring for the airfoil vane of FIG. 2.

The inner and outer platforms 102/104 are supported in inner and outer support rings, respectively. FIG. 3 shows a portion of an example outer support ring 114. The outer support ring 114 is in turn connected to a casing structure of the engine 20. In the example of FIG. 3, the outer support ring 114 is connected to the casing structure via lugs 116 that extend through openings 118.

Referring back to FIG. 2, the outer platform 104 includes a leading edge 104a and a trailing edge 104b. Each of the leading and trailing edges 104a/104b include a recess 120a, 120b, respectively, in a radially outer face of the outer platform 104. The recesses 120a/120b can be machined into the outer platform 104 by any known method. The respective recesses 120a/120b of adjacent outer platforms 104 together define a slot 120.

Figure 4:
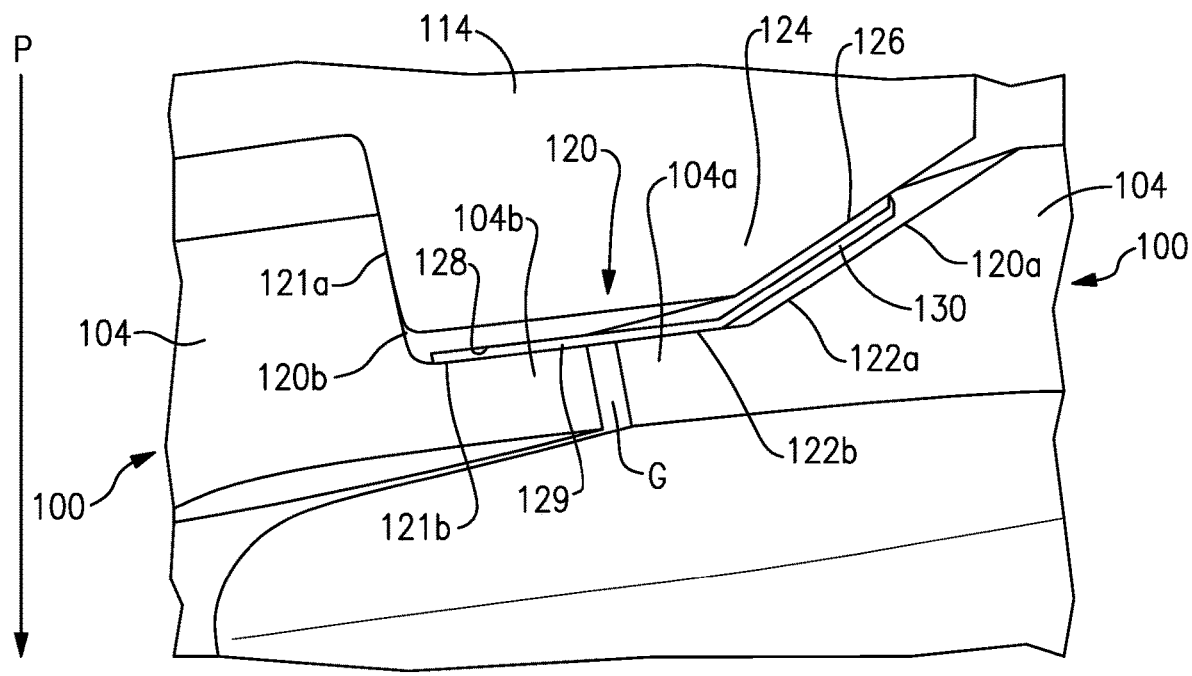
FIG. 4 schematically shows a detail view of a slot in an outer platform of the airfoil vane of FIG. 2.

FIG. 4 shows a cross-sectional view of the slot 120 taken along the section line A-A in FIG. 2. Referring to FIGS. 3 and 4, the outer support ring 114 includes pedestals 124 which extend radially inward from an inner surface of the outer support ring 114 and are configured to be received in the slot 120. The pedestal 124 has a geometry that generally tracks the geometry of the slot 120. That is, at least part of the radially inward face of the pedestal 124 has a geometry that corresponds to the geometry of the slot 120.

Each recess 120a/120b is defined by a radial face and a circumferential face. In this example, a circumferential face 121a of the recess 120b in the trailing edge 104b of the outer platform 104 is generally perpendicular to a radial face 121b of the recess 120b. A circumferential face 122a of the recess 120a in the leading edge 104a of the outer platform 104 forms an obtuse angle with a radial face 122b of the recess 120a. Accordingly, in this example, the pedestal 124 includes a biased portion 126 in its radially inward face which corresponds to the radial face 122b of the recess 120a. However, other geometries of the recesses 120a/120b and the pedestal 124 are contemplated, so long as they track one another.

A sealing element 128 is situated in the slot 120, between the platforms 104 and the outer support ring 114, to discourage leakage between adjacent airfoil vanes 100 and in particular between adjacent outer platforms 104 at a gap G. Each airfoil vane 100 receives cooling air in the internal cavity 110, such as bleed air from the compressor section 24. Leaking of this cooling air between adjacent airfoil vanes 100 decreases cooling efficiency of the individual airfoil vanes 100 and the local system, e.g., turbine 28, in this example.

Figure 5:
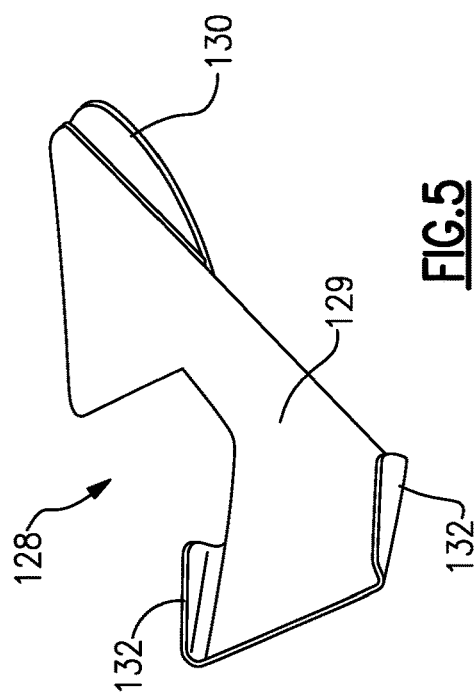
FIG. 5 schematically shows a sealing element for the slot of FIGS. 2-4.

FIG. 5 shows a detail view of the sealing element 128. Referring to FIGS. 2-5, the sealing element 128 has a geometry that generally tracks the geometry of the slot 120. That is, at least part of the periphery of the sealing element 128 has a geometry that corresponds to the geometry of the slot 120. Due to the corresponding geometry of the slot 120 and the sealing element 128, the sealing element 128 is trapped in the slot 120 by a form-fit relationship between the sealing element 128 and the slot 120 that retains the sealing element 128 in the slot 120 in axial and circumferential dimensions. As shown in FIG. 2, the sealing element 128 in this example is smaller in its axial extent than the axial extent of the slot 120. In other examples, the sealing element 128 has the same axial extent of the slot 120.

In this example, the sealing element 128 has a main body portion 129 and a biased portion 130 extending from the main body portion 129. The biased portion 130 corresponds to the radial face 122a of the recess 120a, and is angled with respect to the main body portion 129 at an angle that corresponds to the angle between the circumferential and radial faces 122a/122b of the recess 120a. Accordingly, in this example, the biased portion 130 is situated in the recess 120a, while the main body portion 129 is situated in the recess 120b. In this example, the biased portion 130 is semi-circular in shape, e.g., the biased portion 130 has an arcuate edge, though other shapes are contemplated.

As best shown in FIG. 4, the biased portion 126 of the pedestal 124 retains the biased portion 130 of the sealing element 128 against the circumferential face 122a of the recess 120a by urging the biased portion 130 of the sealing element 128 radially downward against the radial face 122a. Accordingly, the pedestal 124 provides radial retention of the sealing element 128 in the slot 120. During operation of the engine 20, the sealing element 128 experiences a pressure load P which is generally in a direction towards the central axis A of the engine 20 (FIGS. 1 and 2). The pressure load P urges the sealing element 128, and especially the main body portion 129, which is situated normal to the pressure load P, radially inward towards the outer platform 104. The pressure load P and the pedestal 124 thus together trap the sealing element 128 (e.g., both the main body portion 129 and the biased portion 130) in the radial direction against the adjacent outer platforms 104 to provide the sealing discussed above. In one example, the pedestals 124 include a cooling hole 131 which is configured to transmit cooling air, such as bleed air from the compressor section 24 (FIG. 1) through the outer support ring 114 into the slot 120 against the sealing element 128. In other examples some or all pedestals 124 do not include a cooling hole 131. The cooling air contributes to the pressure load P. In another example, a biasing member, such as a spring, can be included to provide further biasing of the sealing element 128 against the outer platforms 104 in the radial direction.

The main body portion 129 includes legs 132, which extend from the main body portion 129 to receive and thus engage the lugs 116 in the outer support ring 114. The legs 132 are situated at an opposite end of the main body portion 129 from the biased portion 130.

The sealing element 128 is formed of a ductile material that is compatible with the CMC material of the platform 104. A compatible material is generally non-abrasive and non-reactive with respect to the CMC material of the platform 104. Accordingly, the sealing element 128 can deform at least somewhat during operation of the engine 20, for example, as a result of the pressure load P, to conform against the platform 104 and provide improved sealing. In some examples, the sealing element 128 is formed form a high-temperature metal, such as a cobalt alloy.

Some comparable sealing arrangements call for the machining of a circumferential slot into the leading/trailing edges 104a/104b radially inward from the outer face of the platforms 104, and placement of a seal in these circumferential slots. These seals can introduce circumferential tensions into the platforms 104, which in some examples, is in a direction that introduces interlaminar tensions between adjacent CMC plies (discussed above). Interlaminar tension can cause delamination, which can weaken the platforms 104. The foregoing sealing arrangement for adjacent airfoil vanes 100 allows the sealing element 128 to be situated and trapped in a slot 120 in the radially outer face of the outer platforms 104. Accordingly, the foregoing sealing arrangement avoids introducing interlaminar tension into the platforms 104.

Though the slot 120 described herein is in a radially outer face of the radially outer platform 104, in other examples, the slot 120 can be included in a radially inner face of the radially inner platform 102. In these examples, the support ring is an inner support ring. The same features and characteristics of the slot 120, support ring 114, and sealing element 128 apply.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a plurality of airfoil vanes situated in a circumferential row about an engine central axis, each of the plurality of airfoil vanes including a first platform, and a second platform, and an airfoil section therebetween, wherein a face of the first platform includes a trailing edge recess and a leading edge recess, and the trailing edge recess and leading edge recesses of adjacent ones of the first platforms together define a slot;
a sealing element situated in each slot, the sealing element having a geometry that tracks the geometry of the slot such that the seal is trapped in the slot by a form-fit relationship in circumferential and axial dimensions by a form-fit relationship between the sealing element and the slot; and
a support ring configured to support each first platform, the support ring including a plurality of pedestals corresponding to each slot and configured to retain the sealing elements in the slots in a radial direction.

2. The gas turbine engine of claim 1, wherein the first platform is a radially outer platform and the support ring is connected to an engine casing structure by a plurality of lugs.

3. The gas turbine engine of claim 2, wherein the sealing elements includes one or more legs configured to engage the plurality of lugs.

4. The gas turbine engine of claim 1, wherein each slot includes first and second portions, the first portion formed in a leading edge of each outer platform and the second portion formed in a trailing edge of each outer platform.

5. The gas turbine engine of claim 4, wherein the first portion is defined by a radial face and a circumferential face, and the circumferential face forms an obtuse angle with the radial face.

6. The gas turbine engine of claim 5, wherein the sealing element includes a main body portion and a biased portion extending from the main body portion at an angle that corresponds to the obtuse angle.

7. The gas turbine engine of claim 6, further comprising a support ring configured to support each platform, the support ring including a plurality of pedestals, wherein each pedestal includes a biased portion that corresponds to the radial face, the biased portion of the each pedestal configured to bias the biased portion of each sealing element against the radial face.

8. The gas turbine engine of claim 7, wherein each pedestal includes a cooling hole configured to transmit cooling air through the support ring into each slot against each sealing element.

9. The gas turbine engine of claim 4, wherein the second portion is defined by a radial face and a circumferential face, and the circumferential face is generally perpendicular to the radial face.

10. The gas turbine engine of claim 1, wherein each sealing element is formed of a ductile metallic material.

11. A method of sealing a plurality of airfoil vanes, comprising:
situating a sealing element in a slot formed in a face of platforms of adjacent airfoil vanes, wherein the sealing element has a geometry that tracks the geometry of the slot such that the sealing element is trapped in the slot in circumferential and axial dimension by a form-fit relationship between the sealing element and the slot; and
supporting the platforms in a support ring, the support ring including a pedestal that is configured to be received in the slot and retain the sealing element in the slot in a radial dimension.

12. The method of claim 11, further comprising providing cooling air to the slot and against the sealing element via a cooling hole in the pedestal.

13. The method of claim 11, wherein the slot includes first and second portions, the first portion formed in a leading edge of a platform of the adjacent outer platforms and the second portion formed in a trailing edge of the other platform of the adjacent outer platforms.

14. The method of claim 13, wherein the first portion is defined by a radial face and a circumferential face, and the circumferential face forms an obtuse angle with the radial face.

15. The method of claim 14, wherein the sealing element includes a main body portion and a biased portion extending from the main body portion at an angle that corresponds to the obtuse angle.

16. The method of claim 15, further comprising supporting the platforms in a support ring, the support ring including a pedestal that is configured to retain the sealing element in the slot.

17. The method of claim 16, wherein the pedestal includes a biased portion that corresponds to the circumferential face, the biased portion configured to trap the biased portion of the sealing element against the circumferential face.

18. The method of claim 11, wherein each sealing element is formed of a ductile metallic material.

19. A gas turbine engine, comprising:
a plurality of airfoil vanes situated in a circumferential row about an engine central axis, each of the plurality of airfoil vanes including a first platform, and a second platform, and an airfoil section therebetween, wherein a face of the first platform includes a trailing edge recess and a leading edge recess, and the trailing edge recess and leading edge recesses of adjacent ones of the first platforms together define a slot;

a sealing element situated in the slot of each of the plurality of airfoil vanes, the sealing element having a geometry that tracks the geometry of the slot such that the sealing element is trapped in the slot by a form-fit relationship in circumferential and axial dimensions by a form-fit relationship between the sealing element and the slot; and a support ring configured to support the first platform of each of the plurality of airfoil vanes, the support ring including a plurality of pedestals corresponding to the slot of each of the plurality of airfoil vanes and configured to retain the sealing elements in the slots in a radial direction.

20. The gas turbine engine of claim 19, wherein the slot of each of the plurality of airfoil vanes includes first and second portions, the first portion formed in a leading edge of the outer platform of each of the plurality of airfoil vanes and the second portion formed in a trailing edge of the outer platform.

* * * * *